United States Patent [19]

Young

[11] Patent Number: 4,806,833
[45] Date of Patent: Feb. 21, 1989

[54] SYSTEM FOR CONDITIONING AIR, METHOD OF OPERATING SUCH, AND CIRCUIT

[75] Inventor: Glen C. Young, Fort Wayne, Ind.

[73] Assignee: General Electric Company, Fort Wayne, Ind.

[21] Appl. No.: 909,547

[22] Filed: Sep. 22, 1986

[51] Int. Cl.⁴ ............................................. G05D 16/20
[52] U.S. Cl. .................................... 318/335; 318/481
[58] Field of Search ............ 318/332, 335, 334, 481; 236/DIG. 9; 307/118

[56] References Cited

U.S. PATENT DOCUMENTS

| | | | |
|---|---|---|---|
| 3,426,273 | 2/1969 | Kuntz | 324/68 |
| 3,517,308 | 6/1970 | Mirdadian | 324/68 |
| 3,550,426 | 12/1970 | Griffo | 73/3 |
| 3,765,234 | 10/1973 | Sievert | 73/136 |
| 3,818,298 | 6/1974 | Eriksson | 318/332 |
| 3,955,130 | 5/1976 | Graf | 318/332 |
| 4,005,347 | 1/1977 | Erdman | 318/354 |
| 4,009,825 | 3/1977 | Coon | 318/349 X |
| 4,044,287 | 8/1977 | Ratzel et al. | 318/332 X |
| 4,097,789 | 6/1978 | Doemen | 318/331 X |
| 4,099,111 | 7/1978 | Inoba et al. | 318/332 X |
| 4,169,990 | 10/1979 | Lerdman | 318/138 |
| 4,274,036 | 6/1981 | Fukasaku et al. | 318/331 |
| 4,389,886 | 6/1983 | Korczak | 73/168 |
| 4,390,826 | 6/1983 | Erdman | 318/439 |
| 4,449,079 | 5/1984 | Erdman | 318/138 |
| 4,467,657 | 8/1984 | Olsson | 73/861 |
| 4,500,821 | 2/1985 | Bitting | 318/254 |
| 4,535,275 | 8/1985 | Muller | 318/254 |
| 4,540,921 | 9/1985 | Boyd | 318/254 |
| 4,544,868 | 10/1985 | Murtz | 318/254 |
| 4,638,233 | 1/1987 | Erdmann | 318/439 X |

*Primary Examiner*—Bentsu Ro
*Attorney, Agent, or Firm*—Ralph E. Krisher, Jr.

[57] ABSTRACT

A method of operating a system for conditioning air including a variable speed blower for flowing the conditioned air through a contained space having a static pressure therein. In this system, the speed of the blower is set to effect a preselected flow rate at an existing static pressure in the contained space, and the speed of the blower is altered only in response to a variation in the static pressure and only in following relation with the static pressure variation. The speed alteration of the blower is sensed, and the speed of the blower is adjusted in following relation with the sensed speed alteration to establish the preselected flow rate through the contained space at the varied static pressure acting on the blower.

A system for conditioning air and a circuit are also disclosed.

21 Claims, 4 Drawing Sheets

SYSTEM FOR CONDITIONING AIR, METHOD OF OPERATING SUCH, AND CIRCUIT

CROSS-REFERENCE TO RELATED APPLICATION

This application is related to the commonly assigned application Ser. No. 791,026 filed Oct. 25, 1985 which is incorporated by reference herein.

FIELD OF THE INVENTION

This invention relates in general to systems for conditioning the temperature of a space and in particular to a system for conditioning air and for maintaining a preselected flow rate of the conditioned air through at least a part of the system regardless of the static pressure therein, a method of operating a system for conditioning air, and a circuit.

BACKGROUND OF THE INVENTION

In the past, various different schemes are believed to have been utilized in an attempt to flow air through a contained space of a system including an apparatus for conditioning the temperature of the air with the rate of such air flow being related to the static pressure associated with such system. Both the speed and torque of an electric motor in the apparatus and operable generally for driving a fan or blower of the apparatus to effect the air flow through the system are affected by the static pressure thereof, and the rate of air flow (CFM - cubic feet per minute) through the apparatus also affects the motor speed and torque. Thus, if the motor speed and torque were ascertained, the fan manufacturer's data then permitted the calculation of both the flow rate and the static pressure. Motor speed or torque by itself was not enough to determine flow rate or static pressure if the other was not known. In view of the foregoing, it is believed that one of the undesirable features of the aforementioned past apparatus involved rather laborious and time consuming attempts to match motor speed and torque with the proper fan to at least approximate the desired air flow rate for the particular contained space and static pressure of the particular past apparatus or the system in which such apparatus was employed.

Even if the aforementioned match of motor speed and torque with the proper fan might have been made thereby to attain the desired air flow rate for the contained space and static pressure of the past apparatus or system in which it was employed, such static pressure may have been altered during the operation of such system. For instance, it is believed that the opening, closing or mere adjustment of a vent or the like connecting a conditioned space in air flow relation with the system affected the static pressure thereof. Therefore, it is believed that another of the disadvantageous or undesirable features of the past apparatus was that it was unable to accommodate variations in the static pressure thereof in the system in which the past apparatus was employed.

In this vein, if the blower utilized in the past system was of the fan or blade type, a decrease in the static pressure acting on such fan resulted in an increase in the speed of the fan and the electric motor driving it. Conversely, if the static pressure acting on the fan was increased, the speed of the fan and the electric motor decreased. Thus, the speed of the fans and electric motors utilized in the past systems varied inversely, i.e., in an inverse relation, with a variation of the static pressure in the past system.

While blowers of the squirrel cage type have also been employed in the past systems, the Applicant has ascertained that a decrease in the static pressure acting on such squirrel cage blower results in a decrease in the speed of the squirrel cage blower and the electric motor driving it. Conversely, Applicant has also ascertained that if the static pressure acting on the squirrel cage blower is increased, the speed of the squirrel cage blower and its driving electric motor is increased. Thus, it was found that the speed of the squirrel cage blower and its driving electric motor varies directly, i.e. in following relation, with a variation of the static pressure.

SUMMARY OF THE INVENTION

Among the several objects of the present invention may be noted the provision of an improved system for conditioning air and for maintaining a preselected flow rate of the conditioned air through at least a part of the system regardless of the static pressure therein, an improved method of operating the system, and an improved circuit which overcome the above discussed disadvantageous or undesirable features, as well as others, of the prior art; the provision of such improved system and method in which the preselected flow rate is closely controlled; the provision of such improved system and method in which variations in the static pressure are readily accommodated; the provision of such improved system and method in which the speed of a blower means and a dynamoelectric machine driving it is altered in following relation with variations in the static pressure acting on the blower means; the provision of such improved system and method in which the energization of a dynamoelectric machine is adjustably regulated in order to maintain the preselected flow rate at different static pressures acting on the blower means; the provision of such improved circuit in which signals of a speed setting means and a speed sensing means for the dynamoelectric machine are additive to control the speed thereof; and the provision of such improved system, method and circuit utilizing component parts which are simple in design, easily assembled and economically manufactured. These as well as other objects and advantageous features of the present invention will be in part apparent nd in part pointed out hereinafter.

In general, a system is provided in one form of the invention for conditioning air and for maintaining a preselected flow rate of the conditioned air through a contained space with respect to the static pressure therein. The system has blower means rotatable at a speed against an existing static pressure in the contained space for establishing the preselected flow rate therethrough of the conditioned air. Means is provided for varying the static pressure in the contained space, and the blower means is responsive only to the static pressure variation to effect an alteration in the speed of the blower means in following relation with the static pressure variation. A variable speed dynamoelectric machine is energized to rotatably drive the blower means, and means is associated with the dynamoelectric machine for sensing the speed alteration of the blower means. Control means is operable generally for regulating the energization of the dynamoelectric machine, and the control means is responsive to the sensing means to adjust the energization of the dynamoelectric machine in following relation with the sensed speed alteration so as to reestablish the preselected flow rate of the conditioned air through the contained space at the varied static pressure acting on the blower means driven by the dynamoelectric machine.

Also in general and in one form of the invention, a method is provided for operating a system for conditioning air. The system has a static pressure adapted to be varied and includes a variable speed blower means rotatably operable for flowing the conditioned air through at least a part of the system. In practicing this method, the speed of the blower means is set to effect a preselected flow rate of the conditioned air through the at least a part of the system at an existing static pressure therein, and the speed of the blower means is altered only in response to a variation in the static pressure and only in following relation with the static pressure variation. The alteration in the speed of the blower means is sensed, and in response to the sensed speed alteration, the speed of the blower means is adjusted in following relation with the static pressure variation so as to establish the preselected flow rate of the conditioned air through the at least part of the system at the varied static pressure.

Further in general, a circuit in one form of the invention is provided for controlling a dynamoelectric machine associated in driving relation with a blower in an air handling system, and the circuit provides control of blower speed over a range of static pressure variations to maintain relatively constant air flow in the system. The circuit has a power switching circuit operable generally to supply power to the dynamoelectric machine to effect the drive of the blower, and the power supplied to the dynamoelectric machine is proportional to an operating speed thereof. Regulator means responsive to a signal representative of a preselected operating speed of the dynamoelectric machine and a signal representative of the power supplied to the dynamoelectric machine for controlling the operation of the power switching circuit. Tachometer means is operable generally for sensing the operating speed of the dynamoelectric machine and for providing a signal representative thereof to the regulator means, and means is associated with the regulator means for summing the tachometer means signal with the preselected operating speed signal to vary the operating speed of the dynamoelectric machine in following relation with the static pressure variations in the system so as to maintain the relatively constant air flow therein.

BRIEF DESCRIPTION OF THE DRAWINGS

Corresponding reference characters indicate corresponding parts throughout the several views of the drawings.

The exemplifications set out herein illustrate the preferred embodiments of the present invention in one form thereof, and such exemplifications are not to be construed as limiting in any manner either the scope of such invention or the scope of the disclosure thereof.

DETAILED DESCRIPTION OF THE PREFERRED EMBODIMENTS

Figure 1:
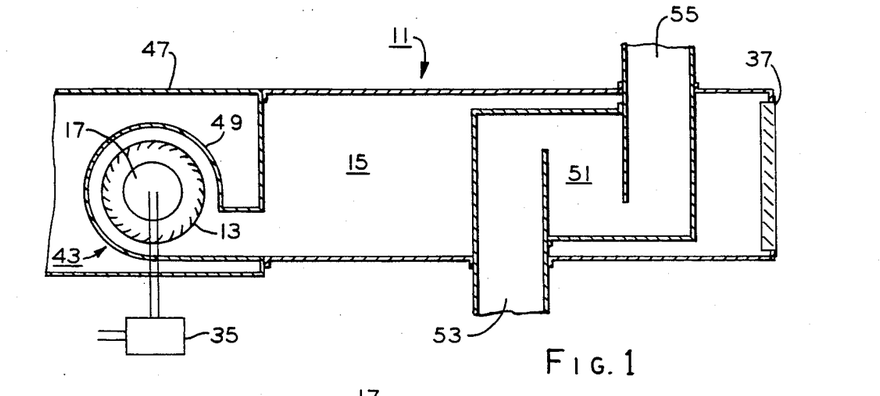
FIG. 1 is a schematic view showing a typical system for conditioning air built in accordance with the preferred embodiment of the invention, respectively, and illustrating principles which may be practiced in a method of operating the system also in one form of the invention.
Figure 4:
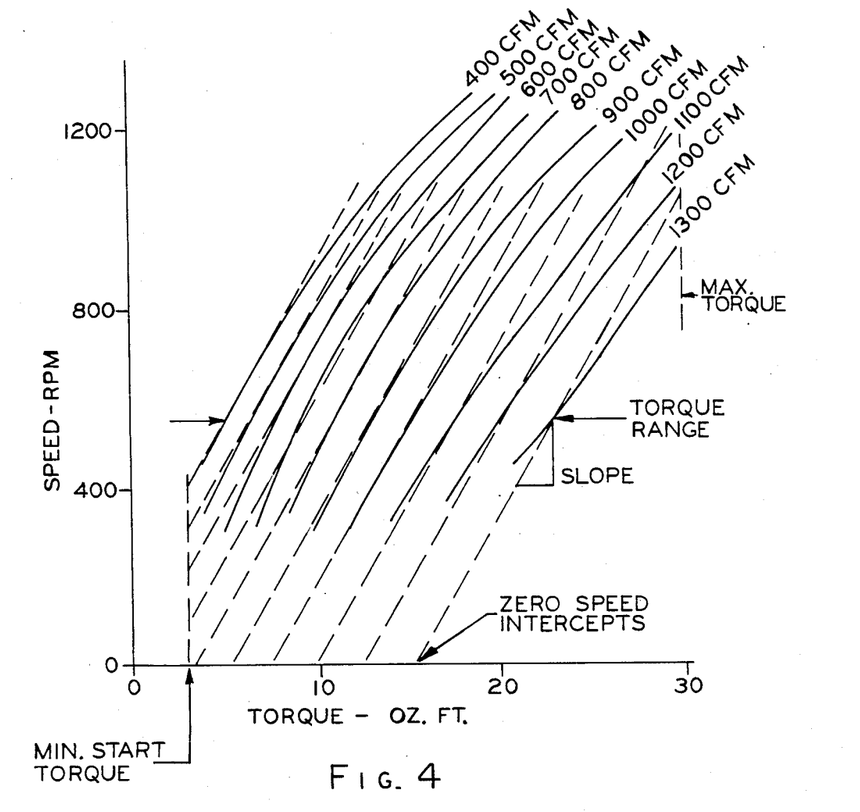
FIG. 4 is a graphical representation of the CFM flowed at various static pressures in the system of FIG. 1 with the CFM being a function of the speed and torque of a typical blower means.
Figure 5:
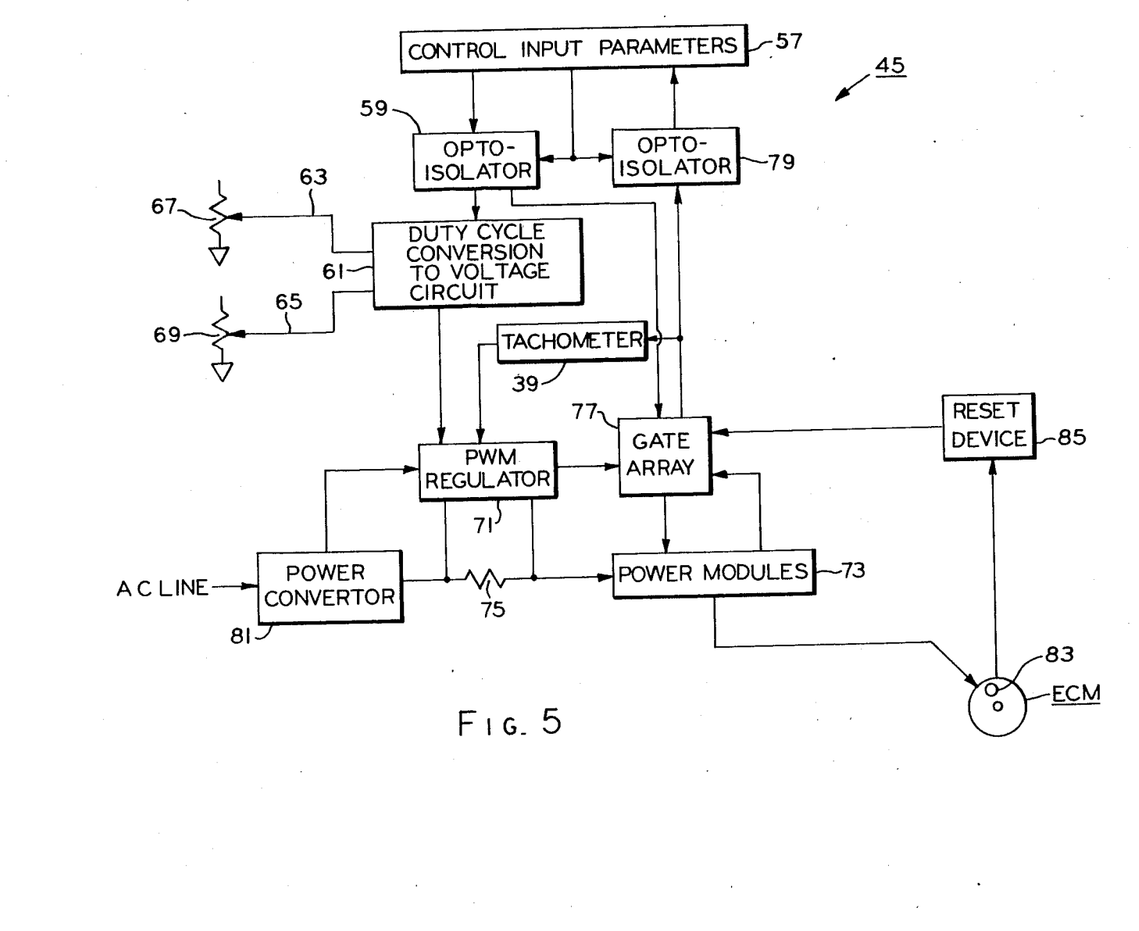
FIG. 5 is a block diagram of a circuit in one form of the invention for controlling the energization of the dynamoelectric machine of FIG. 2 in the apparatus of FIG. 1.
Figure 6:
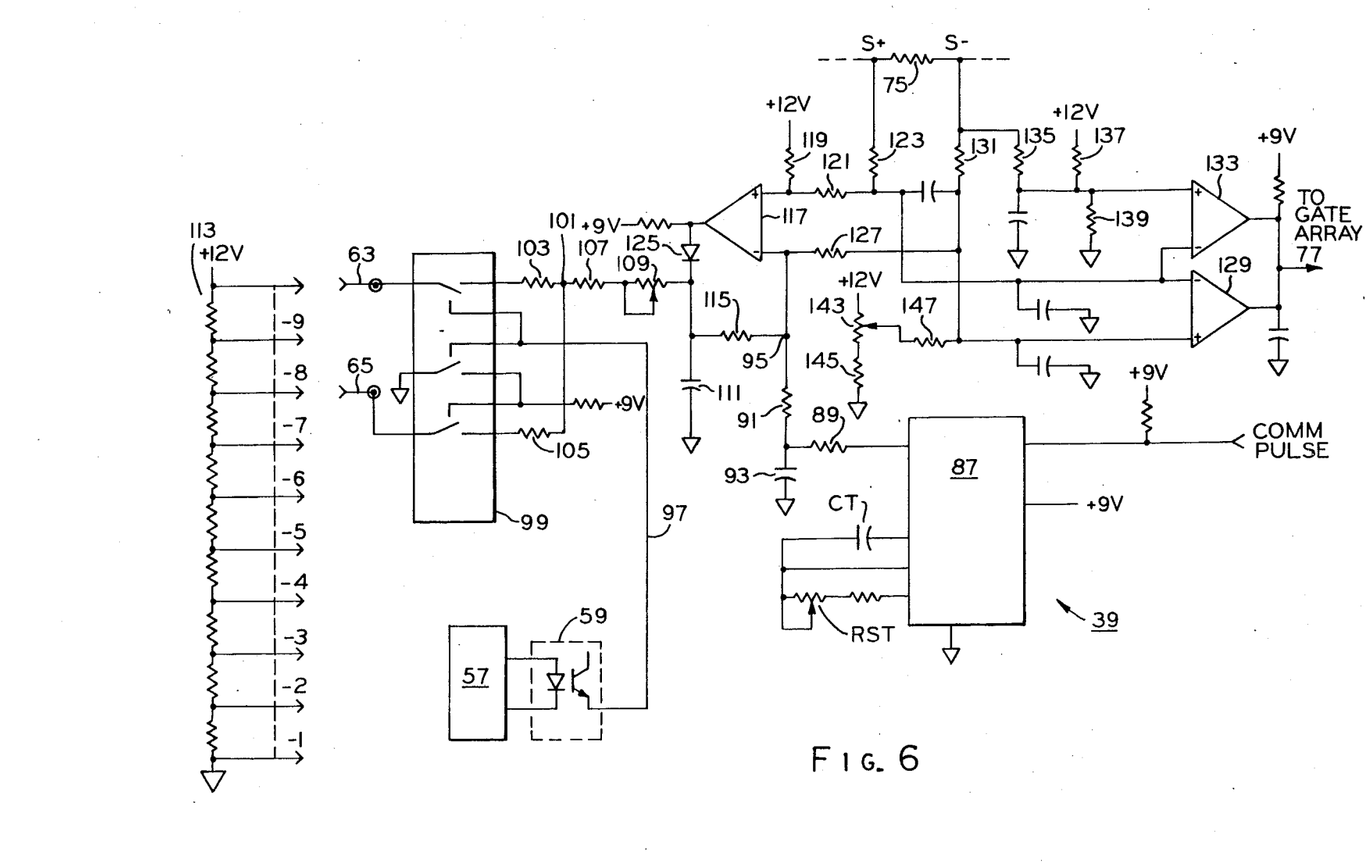
FIG. 6 is a schematic diagram showing the essential elements of some of the circuitry shown in FIG. 5.

With reference now to the drawings in general, there is illustrated a typical system 11 built in accordance with the preferred embodiment of the invention and a method of operating a system 11 for conditioning air (FIG. 1). System 11 has a static pressure adapted to be varied, and the system includes a variable speed blower or blower means 13 rotatably operable for flowing the conditioned air through at least a part of the system, such as for instance, a contained space or the like indicated generally at 15 (FIGS. 1 and 4–6). In the practice of this method, the speed of the blower is set to effect a preselected flowrate of the conditioned air through the at least part of the system part or contained space 15 at an existing static pressure therein, and the speed of the blower is altered only in response to a variation in the static pressure and in direct or following relation with the static pressure variation (FIGS. 4–6). The alteration in the speed of blower 13 is sensed, and in response to the sensed speed alteration, the speed of the blower is adjusted to effect a variation in the flow rate in direct or following relation with the static pressure variation so as to establish the preselected flow rate of the conditioned air through contained space 15 at the varied static pressure (FIGS. 1 and 4–6).

Figure 2:
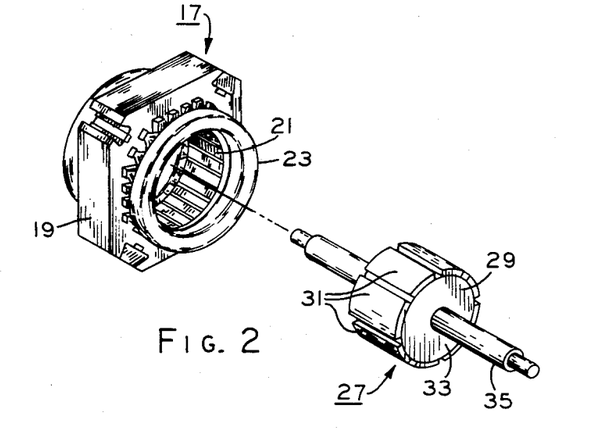
FIG. 2 is an exploded perspective view of a typical variable speed dynamoelectric machine which may be utilized to rotatably drive a blower means in the system of FIG. 1.
Figure 3:
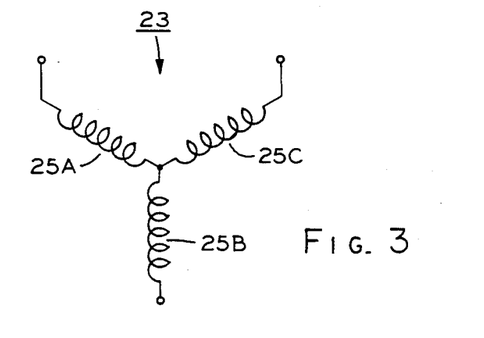
FIG. 3 is a schematic view showing a multi-stage winding arrangement for the dynamoelectric machine of FIG. 2.

More particularly and with specific reference to FIGS. 1 and 2, a variable speed dynamoelectric machine, such as for instance an electronically commutated motor 17 (hereinafter sometimes referred to as an ECM), has a stationary assembly 19 which includes a core or stator 21 of suitable ferromagnetic material, and a multistage winding arrangement 23 is associated with the stationary assembly having a plurality of winding stages 25A, 25B, 25C, as best seen in FIG. 3, with at least some of the winding stages being adapted to be electronically commutated in at least one preselected sequence, as discussed in greater detail hereinafter. A rotatable assembly 27 of ECM 17 is rotatably associated with stationary assembly 19 and comprises a permanent magnet rotor or rotor means 29 operable generally for rotatably driving blower 13 and associated in selective magnetic coupling relation with winding stages 25A, 25B, 25C so as to be rotatably driven by the winding stages upon the electronic commutation thereof. Permanent magnet rotor means 29 includes a plurality of magnet material elements 31 secured to a rotor 33 generally about the circumference thereof, and the rotor is secured about a shaft 35. Albeit not shown for purposes of drawing simplification and brevity of disclosure, rotor shaft 35 may be journaled by suitable bearing means in a pair of opposite end frames forming a part of stationary assembly 19 of ECM 17, and the rotor shaft is, of course, adapted to be coupled in rotatable driving relation with blower 13. Furthermore, while ECM 17 is illustrated herein as having three winding stages 25A, 25B, 25C, it is contemplated that an ECM having any convenient number of winding stages greater than one may be employed within the scope of the invention so as to meet at least some of the objects thereof. If a more detailed discussion of the construction and operation of an ECM, such as that indicated herein at 17, is desired, reference may be had to U.S. Pat. No. 4,005,347 issued Jan. 25, 1977 and U.S. Pat. No. 4,169,990 issued Oct. 2, 1979 each of which is incorporated by reference herein. Further, while ECM 17 is illustrated and discussed herein as rotatably driving blower 13 for convenience of disclosure, it is contemplated that various other electric motors of the variable speed type may be utilized to rotatably drive the blower within the scope of the invention so as to meet at least some of the objects thereof. Additionally, blower 13 as illustrated and discussed herein is of the squirrel cage type as well known in the art.

It may be noted that the only preliminary step necessary in the practice of the operating method of this invention is to choose or preselect the flow rate desired for the flow of the conditioned air through contained space 15 of system 11 regardless of the static pressure therein. Upon the aforementioned election or determination of the preselected flow rate for system 11, at least some of winding stages 25A, 25B, 25C of ECM 17 may be electronically commutated in the aforementioned at least one preselected sequence, and current at least generally at a preselected value may be supplied to such winding stages upon the electronic commutation thereof. Permanent magnet rotor means 29 is associated in selective magnetic coupling relation with winding stages 25A, 25B, 25C of ECM 17, and upon the electronic commutation of at least some of the winding stages, the permanent magnet rotor means and blower 13 are conjointly rotated. Thus, the supply of current at the preselected value thereof to ECM 17 to effect its energization, as discussed above, sets or establishes the speed at which permanent magnet rotor means 29 of the ECM and blower 13 are rotated against the then existing static pressure in contained space 15 of system 11. Of course, the existing static pressure in contained space 15 reacts against the rotation of blower 13 so as to establish the preselected flow rate of the conditioned air through the contained space at the existing static pressure therein.

The static pressure in contained space 15 may be varied or changed by the opening, closing or merely adjusting a means, such as for instance a register or vent 37 or the like, for venting the contained space as well known to the art. Upon varying the static pressure in contained space 15 acting on blower 13 therein, it may be noted that the speed of both permanent magnet rotor means 29 and the blower is altered or varied only in response to the varied static pressure acting on the blower, and it may be further noted that such speed alteration of the blower is in the aforementioned direct or following relation with the static pressure variation. In other words, when the static pressure variation effects an increase of the static pressure in contained space 15, such increased static pressure acting on blower 13 effects an increase in the speed thereof; and, when the static pressure variation effects a decrease of the static pressure in the contained space, such decreased static pressure acting on the blower effects a decrease in the speed thereof. Furthermore, it may be noted that the aforementioned speed alteration of blower 13 in following relation with the static pressure variation in contained space 15 is independent of the energization of ECM 17 and the speed of its permanent magnet rotor means 29 which is drivingly coupled with the blower.

A sensor or sensing means, such as for instance a tachometer 39 or the like is associated with ECM 17 and measures or senses the speed of permanent magnet rotor means 29 in its driving relation with blower 13. Therefore, since blower 13 and permanent magnet rotor means 29 are drivingly coupled, the rotational speed of the permanent magnet rotor means sensed by tachometer 39 upon the energization of ECM 17 is the same as that of the blower. Upon the sensing of the altered speed of blower 13, tachometer 39 is operable to effect an adjustment in the current supplied to winding stages 25A, 25B, 25C, as discussed in greater detail hereinafter, upon the electronic commutation of at least some of the winding stages. In response to the aforementioned adjustment in the current energizing ECM 17, permanent magnet rotor means 29 and blower 13 are conjointly rotated at another or an adjusted speed against the varied static pressure in contained space 15 acting in the blower to reestablish the preselected flow rate at the varied static pressure in the contained space. Thus, in response to the sensed speed alteration of blower 13, the speed of the blower is adjusted to effect a variation in the flow rate of the conditioned air through contained space 15 in following relation with the static pressure variation effected therein, and in this manner, the preselected flow rate of the conditioned air through the contained space is reestablished at the varied static pressure.

Referring again to the drawings in general and recapitulating at least in part with respect to the foregoing, system 11 in one form of the invention is provided for conditioning air and for maintaining the preselected flow rate of the conditioned air through contained space 15 with respect to the static pressure therein (FIG. 1). In system 11, blower 13 is rotatable at a speed against the existing static pressure in contained space 15 for establishing the preselected flow rate therethrough (FIGS. 1 and 4-6). Vent or venting means 37 is operable for varying the static pressure in contained space 15, and blower 13 is responsive to only the static pressure variation to effect the alteration in the speed of the blower in following relation with the static pressure variation (FIGS. 1 and 4). ECM 17 is energized to rotatably drive blower 13, and tachometer 39 is associated with the ECM for sensing the speed alteration of the blower (FIGS. 1, 2, 5 and 6). Control means, such as of instance a pulse width modulating circuit 41 or the like, is operable generally for regulating the energization of ECM 17, and the control means is responsive to tachometer 39 to adjust the energization of the ECM in following relation with the sensed speed alteration of blower 13 thereby to reestablish the preselected flow rate of the conditioned air through contained space 15 at the varied static pressure acting on the blower rotatably driven by the ECM (FIGS. 1, 5 and 6).

More particularly and with specific reference to FIGS. 1 and 5, air handling system 11 includes an apparatus 43 for conditioning the temperature of the air flowed in the system and also a circuit 45 in one form of the invention for controlling the operation of the apparatus to maintain the preselected flow rate of the conditioned air in the system. System 11 has suitable ductwork 47 defining contained space 15 through which the conditioned air is flowed from apparatus 43 through vent 37 into a room or space in a building (not shown). Apparatus 43 includes blower 13 and ECM 17, and a housing or casing 49 for the blower is associated with system ductwork 47 so as to define therewith contained space 15. A heat exchanger 51 of apparatus 43 is disposed within contained space 15 of system 11, and blower 13 effects the passage of air through the system in heat exchange relation with the heat exchanger. Heat exchanger 51 is connected at 53 to suitable means, such as for instance a fire box of a furnace or the like (not shown), for providing a heating medium to the heat exchanger which is in heat exchange relation with the air being passed over it, as previously mentioned, and the heat exchanger is also connected at 55 to suitable means, such as for instance a flue or the like (not shown) for distributing or delivering the heating medium from the heat exchanger. Although apparatus 43 is illustrated herein as a furnace, it is contemplated that other apparatus, such as a central air conditioning unit, a heat pump unit or an automotive air conditioner unit or the like for instance, may be utilized within the scope of the invention so as to meet at least some of the objects thereof.

In circuit 45 of FIG. 5, control input parameters are supplied through an input means 57 which establishes a preselected desired air flow rate as a function of the thermal output of a heating or cooling apparatus (not shown). In a preferred embodiment, means 57 comprises a microcomputer having programmed therein a predetermined relationship between thermal capability and air flow. For example, in a cooling system the means 57 would be connected to provide control signals to a compressor for controlling the speed thereof to thereby establish a desired thermal capability. Means 57 would then provide an air flow value signal preselected to establish the most efficient transfer of thermal energy from the cooling apparatus into system 11. The control input parameters to system 11 may be either analogue or digital values. In the interest of electrically isolating input means 57 from the power system for operating ECM 17, the control input parameters were selected to be input to system 11 in a digital form. Preferably, the digital form merely comprises a pulse width modulated signal operating at a predetermined pulse repetition rate suitable for coupling through an optical isolator 59. Optical isolator 59 is of a type well known in the art generally comprising a light emitting diode and a photoresponsive transistor positioned adjacent to the diode which can be switched on and off by light emitted by the diode. Such optical isolators are commercially available devices produced by myriad electronic manufacturers. Optical isolator 59 merely isolates the electrical voltage levels appearing in circuit 45 from the input control means 41.

As will be appreciated, the pulse width modulated signal passed through optical isolator 59 has a time ratio of on time to off time varying between 100% and 0%. In order to utilize this time ratio pulse, width modulated signal in current regulating circuit 45 for ECM 17, it is desirable to convert the pulse width modulated signal to a suitable average voltage level representative of the desired speed of blower 13. This conversion is effected in a duty cycle conversion to voltage circuit 61. As will be noted, conversion circuit 61 has two additional input lines 63, 65. Input line 63 is connected to a voltage reference source 67 which provides a maximum voltage reference setting for ECM 17. Input line 65 is connected to a reference voltage source 69 which provides a minimum voltage reference setting for ECM 17. Voltage reference sources 67, 69 represent settings which can be adjusted to establish a minimum and maximum value o the flow rate for the conditioned air depending upon the use of system 11. If system 11 is being operated at some value less than its maximum capability, the control input parameters established by input means 57 set the appropriate percentage of the maximum capability of the system. In an exemplary system, the lowest minimum value which might be set by adjustment of voltage reference source 69 could be in the range of 400 cubic feet per minute (CFM) of airflow, and the maximum value which might be set by adjustment of voltage reference source 67 could be approximately 1,000 CFM. If system 11 was then operated at some value less than its maximum rated value, input means 57 could provide a reference pulse modulated signal which would reduce the system performance from its maximum 1,000 CFM to some value between the minimum and maximum values. For example, at 50% capacity, the conversion circuit 61 might be set to provide system airflow of 700 CFM. The operation of conversion circuit 61 is to switch between the maximum setting of input line 63 and the minimum setting of input line 65 at a rate proportional to the pulse width modulated rate coupled through optical isolator 61. The signals obtained from input lines 63, 65 are then averaged to obtain a voltage reference proportional to the time ratio of the pulse width modulated signal.

The voltage reference provided by conversion circuit 61 is coupled to a pulse width modulated regulate circuit or regulator 71 (sometimes hereinafter referred to as a PWM regulator) which uses the voltage reference to regulate the current supplied to a plurality of high voltage switching devices (not shown) located in a power module 73. PWM regulator 71 monitors the current supply to power module 73 by monitoring the voltage developed across a current shunt resistance 75. In the particular implementation of circuit 45 in FIG. 5, PWM regulator 71 uses the reference voltage supplied by conversion circuit 61 to set a peak value for current through shunt 75. In this type of arrangement, the switching devices in power module 73 are gated into conduction at predetermined times, and the length of time that the switching devices remain in conduction is determined by PWM regulator 71. In essence, a switching device in power module 73 is gated into conduction allowing current through shunt 75 to build up to a point at which it reaches or exceeds the reference value supplied from conversion circuit 61. At that point, PWM regulator 71 provides a signal to a gate array circuit 77 to effect a turn off of the conducting switching device in power module 73. Gate array 77 may be a microprocessor based drive circuit for providing control signals to the switching devices in power module 73. Gate array 77 also provides a signal indicating each time that a switching device is commutated or gated into conduction in power module 73, and such pulses are representative of the speed of ECM 17 since, as is well known in the art, the rotational speed of the ECM is controlled by the gating of the switching devices in power module 73. The commutation pulses may be coupled through another optical isolator 79 to input means 57 for providing a readout of the speed of blower 13.

Circuit 45 includes an AC to DC power converter 81 which converts incoming alternating current power to direct current power for use by the circuitry powering ECM 17. Converter 81 may be any of a number of well known types of converters, such as for example a full wave bridge diode rectifier circuit or the like. If desired, a thermal protection device 83 of a type well known to the art may be associated with ECM 17 to cause the power to be removed therefrom in the event of the occurrence of an overheat condition, and the thermal protection device is generally connected to provide a signal to gate array 77 for inhibiting power to ECM 17 in the event of the occurrence of the overheat condition. A reset device 85 of a type well known in the art is operable to sense that thermal protection device 83 has cooled and reset, and the reset device couples a reset signal to gate array 77 to allow the restarting of ECM 17. Such reset devices are also well known in the art.

As was described previously, in the event of a change in the static pressure in system 11, the speed of blower 13 is directly affected. The phenomenon whereby the speed of blower 13 varies directly with static pressure variations is believed to be related to a change in air motion caused by the static pressure variation which alters the volume of air passing through the blower thus allowing its speed to vary by unloading the motor and reducing the torque required to drive the motor. Nevertheless, the net result of static pressure variation is a change in speed and torque of blower 13 and ECM 17 connected in driving relation thereto in following relation with the static pressure variation. When this phenomenon occurs, it is sensed by tachometer 39 which monitors the commutation pulses being provided by gate array 77. Considering a speed increase of the blower 13, it obviously does not increase sufficiently to compensate for the reduced air flow through system 11; therefore, it is desirable to provide a further increase in the speed of the blower in order to bring the CFM or flow rate of the conditioned air in contained space 15 back to its desired level. Tachometer 39 senses the increase in speed of blower 13 and ECM 17 and provides an additional signal to PWM regulator 71 for causing an increase in the torque of the ECM and blower by adding an additional signal to the reference voltage provided by conversion circuit 61. Accordingly, the system 11 operates with a positive torque loop so that any increase in the speed of blower 13 and ECM 17 is accompanied by a positive torque increase which causes a still further increase in the speed of ECM 17. From the above description, it will be apparent that the disclosed ECM control system operates as an open loop system for causing an increase in ECM torque to thereby vary speed in correspondence with the curves illustrated in FIG. 4 to maintain a desired CFM.

While conversion circuit 61, tachometer 39 and PWM regulator 77 will be described in more detail with reference to FIG. 6, corresponding description of gate array 77 and power module 73 are not provided herein for the sake of brevity of disclosure. If a more detailed discussion of the circuitry involved in the power control of ECM 17 and a method of operating such circuitry is desired, reference may be had to U.S. Pat. No. 4,540,921 issued Sept. 10, 1985 which is incorporated herein by reference. The detailed implementation of a position sensing system incorporated with power module 73 for providing feedback signals which are useful in generating a speed signal or commutate pulse signal is described in detail in U.S. Pat. No. 4,169,990 issued Oct. 2, 1979 which is also incorporated herein by reference.

Considering generally FIGS. 5 and 6, and with specific reference to FIG. 6, the commutation pulses from gate array 77, developed in the manner disclosed in the aforementioned U.S. patents, are coupled to tachometer 39. Tachometer 39 comprises a one shot or monostable multi-vibrator 87 of a type well known in the art. For instance, multi-vibrator 87 may be a type 4047 available from Texas Instruments Inc. of Dallas, Tex. Multi-vibrator 87 includes an external capacitor CT and an external variable resistor RST, which resistor RST can be adjusted to set the time duration of a pulse generated by the multi-vibrator. Upon receipt of a commutate pulse (COMM PULSE) from gate array 77, multi-vibrator 87 generates a pulse having a preselected time duration, which pulse is coupled through an RC filter comprising a first resistor 89, a second resistor 91 and a capacitor 93. Capacitor 93 is connected between a junction intermediate resistors 89, 91 and a common or reference ground terminal. Resistor 89 and capacitor 93 serve to average the pulses from multi-vibrator 87 and convert the pulses to an average voltage value whose amplitude is proportional to the frequency of the pulses. Resistor 91 serves to couple the averaged value of the voltage pulses to a summing junction 95. Tachometer 39 merely provides a DC voltage proportional to the speed of permanent magnet rotor means 29 of ECM 17 and associated blower 13.

The control input signal provided by control means 57 is coupled through optical isolator 59 and then via line 97 to a type 4066 C-MOS analogue gate 99 within conversion circuit 45. Analogue gate 99 has first and second input terminals connected respectively to maximum and minimum voltage reference input lines 63, 65. When the control input signal supplied to gate 99 is at a high or positive voltage level, the gate couples the voltage reference appearing on line 63 to a summing junction 101 via coupling resistor 103. When the control input signal voltage is at a low or ground reference level, gate 99 switches and couples the voltage on line 65 to junction 101 via coupling resistor 105. In this manner, the control signals coupled through optical isolator 59 cause the output voltage from gate 99 to switch between the maximum reference voltage and the minimum reference voltage on line 63, 65, respectively, in response to the pulse width modulated signals from control means 57. In essence, gate 99 provides level shifting of the pulse width modulated control input signal. The pulse width modulated voltage developed at summing junction 101 is coupled through a second RC filter comprising a fixed resistor 107, variable resistor 109 and capacitor 111 which averages the pulse width modulated signal to develop a corresponding analogue voltage reference.

The voltage reference signal developed on capacitor 111 is coupled through a resistor 115 to summing junction 95. It should be noted that the maximum and minimum reference signals are preferably taken from a voltage divider network 113 comprising a plurality of serially connected resistors with appropriate terminals between the resistors to permit a plurality of reference values to be selected. The serially connected train of resistors is connected across a regulated voltage source as to provide a preselected voltage value at each of its output connections between each of the serially connected resistors. The resistors may be arranged, for example, to provide a maximum value of 1,400 CFM and a minimum value of 400 CFM with appropriate intermediate steps. Clearly, other values of CFM could be implemented by appropriate selection of voltage reference values and resistor values and by variations in system size, torque and speed capability of ECM 17 and flow capability of blower 13.

The signal appearing at summing junction 95 represents a summed current or voltage from tachometer 39 and conversion circuit 61. This summed signal combines the principle elements of speed compensated torque. The current from conversion circuit 61 determines the selected CFM for system 11 while the current from tachometer 39 provides the torque compensation as a function of speed. Resistor 109 can be adjusted to facilitate trimming of the circuit 61 to achieve a desired torque interval between the taps on the resistor train 113.

In order to assure adequate start current for low CFM output, there is provided a comparator 117 which compares the voltage at junction 95 with a reference voltage established by a voltage divider network comprising resistors 119, 121 and 123. Voltage developed at junction 95 is coupled to an inverting input terminal of comparator 117 while the reference voltage developed by the voltage divider circuit comprising resistors 119, 121, 123 is coupled to a non-inverting input terminal of the comparator. If the summed voltage from conversion circuit 61 and tachometer 39 is insufficient to bias the inverting input terminal above the value set at the non-inverting input terminal of comparator 117, the output voltage developed by the comparator will be at a high or positive voltage value and provide an additional current through a diode 125 to capacitor 111. This additional current from comparator 117 will be summed with the current supplied by conversion circuit 61 and tachometer 39 to further charge capacitor 111 and increase the voltage appearing at junction 95. This voltage forces a current through a resistor 127 to another comparator 129. Comparator 129 provides peak current regulation for gate array 77. The output signal developed by comparator 129 is coupled directly to gate array 77. It should be noted that the purpose of diode 125 is to isolate comparator 117 from capacitor 111 during normal operation.

The resistive shunt 75 is coupled between terminals S+ and S− of PWM regulator 71. The S+ terminal is connected through resistor 123 to the inverting input terminal of comparator 129. The S-terminal is connected through a resistor 131 to the non-inverting input terminal of comparator 129. When there is no current in shunt 75, the reference current through resistor 127 biases the non-inverting input terminal of comparator 129 above the voltage reference provided by the divider circuit comprising resistors 119, 121, 123 at the inverting input terminal of comparator 129. This condition enables the output signal developed by comparator 129 to go to a high value which in turn enables gate array 61 to cause conduction in the power circuits driving ECM 17. When the current in shunt 75 has increased to a value which is sufficient to pull the voltage at the non-inverting input of comparator 129 below the reference voltage at the inverting input, the comparator output goes low and shuts off the conducting switching device within the power module 73 thereby terminating current flow to ECM 17 through that device.

In a manner similar to the absence of adequate current for start at low CFM levels, the above described speed compensated torque circuit can produce currents higher than the system rating at combinations of high CFM and speed. To inhibit this condition, another comparator 133 separately monitors the current in shunt 75 and pulls down the output signal developed by comparator 129 when a preset maximum current value is reached. The maximum current value is determined by a voltage divider circuit comprising resistors 135, 137, 139. Resistor 135 connects one terminal of shunt resistor 75 to the non-inverting input terminal of comparator 133. The inverting input terminal of comparator 133 is connected directly to the inverting input terminal of comparator 129. Resistors 137, 139 form a voltage divider connected between a voltage reference, such as for example 12 volts, and ground. The junction intermediate resistors 137,139 is connected to the non-inverting input terminal of comparator 133. Comparators 129, 133 may be part of a quad comparator of a type well known in the art which permits hard wire connections between their outputs which results in a logical 'AND' function between comparators. Both outputs from comparators 129, 133 must be in their inactive or high state to permit resistor 141 to pull the output line which is coupled to gate array 77 to a high or positive voltage level and thereby enable delivery of power to ECM 17. Resistor 141 is connected between the output terminals of the comparators 129, 133 and a voltage reference source.

Bias voltage for the non-inverting input terminal of comparator 129 is supplied by a voltage divider circuit comprising a variable resistor 143 serially connected to a fixed resistor 145. The variable tap on resistor 143 is connected through a resistor 147 to the non-inverting input terminal of comparator 129. The adjustments provided by resistor RST, resistor 143 and resistor 109 allow the control system to be trimmed to achieve, respectively, the desired slope, zero speed intercept and torque interval between CFM taps on the train of resistors 113. Resistor RST adjusts slope by changing the time duration of the pulse output of multi-vibrator 87. An increase in the value of resistor RST produces an increase in the width of the output pulse developed by multi-vibrator 87 which in turn increases the amount of torque supplied for an increase in speed of ECM 17 and associated blower 13. Resistor 143 in combination with resistors 145, 147 adjust the zero speed torque intercept. This adjustment affects all CFM outputs equally. Resistor 109 adjusts the interval between selected CFM taps.

Considering now the graph of FIG. 4, there is shown a sequence of solid lines or curves illustrating the relationship between speed and torque for a typical air conditioning system blower operated by an ECM 17 connected for driving blower 13 in system 11 built in accordance with the preferred embodiment of the invention. Each of the solid lines on the graph represent a constant CFM line. Each line shows the near linear relationship between speed and torque and the variation in speed and torque as static pressure increases for any given CFM. At the highest static pressure, system 11 must run at the highest speed in order to maintain the desired CFM. One can see the effect of increasing blower speed with increasing static pressure. Over the range of CFM varying from approximately 400 CFM to 1,000 CFM, system 11 maintains relatively constant air flow with variations in static pressure. Above 1,000 CFM, there is some reduction in CFM as static pressure increases. The dashed lines overlaying the constant CFM lines indicate the actual torque speed response of the system. The aforementioned adjustments through resistors RST, 143 and 109 effect variations in the slope, intercept and torque interval illustrated by the dashed lines. By adjusting these resistors, the lines can be made to more closely approximate actual characteristics of some of the curves at the expense of others.

From the foregoing, it is now apparent that an improved system 11, method of operating the system and circuit 45 have been presented meeting the objects set out hereinbefore, as well as others, and it is contemplated that changes as to the precise arrangements, shapes, details and connections of the components associated with such system, method and circuit, as well as the precise order of the steps of such method, may be made by those having ordinary skill in the art without departing from the spirit of the invention or from the scope of the invention as set out in the claims which follow.

What I claim as new and desire to secure by Letters of Patent of the United States is:

1. A method of operating a system for conditioning air, the system having a static pressure adapted to be varied and including an electronically commutated motor, and squirrel cage blower means for flowing the conditioned air at a preselected flow rate through at least a part of the system, the electronically commutated motor including a stationary assembly having a multi-stage winding arrangement with a plurality of winding stages, and permanent magnet rotor means operable generally for rotatably driving the squirrel cage blower means, the method comprising the steps of:

electronically commutating at least some of the winding stages of the electronically commutated motor in at least one preselected sequence and supplying current at least generally at a preselected value to the at least some winding stages upon the electronic commutation thereof;

associating the permanent magnet rotor means in selective magnetic coupling relation with the at least some winding stages and rotating conjointly the permanent magnet rotor means and the squirrel cage blower means during the electronically commutating and supplying step;

reacting the static pressure against the squirrel cage blower means and establishing the preselected flow rate in the at least part of the system in response to the associating and rotating step;

varying the static pressure in the at least part of the system reacting upon the squirrel cage blower means;

alternating the speed of both the permanent magnet rotor means and the squirrel cage blower means only in response to the varied static pressure acting on the squirrel cage blower means and in direct relation with the static pressure variation;

sensing the altered speed of the squirrel cage blower means; and adjusting the supply of current to the at least some electronically commutated winding stages and effecting thereby the conjoint rotation of the permanent magnet rotor means and the squirrel cage blower means at another speed against the varied static pressure acting on the squirrel cage blower means to reestablish the preselected flow rate at the varied static pressure in the at least part of the system in response to the sensing step.

2. A method of operating a system for conditioning air, the system having a static pressure adapted to be varied and including a blower means for flowing the conditioned air at a preselected flow rate through at least a part of the system, and an electronically commutated motor adapted to drive the blower means, the method comprising the steps of:

energizing the electronically commutated motor to develop a speed thereof in response to current supplied at least generally at a preselected value to the electronically commutated motor and driving the blower means at the speed of the electronically commutated motor against the static pressure in the at least part of the system to flow the conditioned air therethrough at the preselected flow rate;

altering the speed of the electronically commutated motor and the blower means in following relation with a static pressure variation independently of the energization of the electronically commutated motor and sensing the altered speed of the electronically commutated motor and the blower means; and adjusting the current supplied to the electronically commutated motor to effect its energization at another speed and driving the blower means at the another speed against the varied static pressure to restore the flow of the conditioned air flow in the at least part of the system to the preselected flow rate in response to the sensing of the altered speed.

3. The method as set forth in claim 2 wherein the altering and sensing step includes effecting one of an increase and a decrease in the static pressure upon the variation thereof.

4. The method as set forth in claim 3 wherein the altering and sensing step further includes causing one of an increase and a decrease in the altered speed in the following relation with the one of the increase and the decrease effected in the static pressure.

5. The method as set forth in claim 2 wherein the adjusting and driving step includes effecting one of an increase and a decrease in the current supplied to the electronically commutated motor.

6. The method as set forth in claim 5 wherein the adjusting and driving step further includes causing one of an increase and a decrease in the speed of the electronic commutated motor to the another speed thereof in following relation with the one of the increase and the decrease effected in the current supplied to the electronically commutated motor.

7. A method of operating a system for conditioning air, the system having a static pressure adapted to be varied and the system including a variable speed blower means rotatably operable for flowing the conditioned air through at least a part of the system, the method comprising the steps of:

setting the speed of the blower means to effect a preselected flow rate of the conditioned air through the at least part of the system at an existing static pressure therein;

altering the speed of the blower means only in response to a variation in the static pressure and in following relation with the static pressure variation;

sensing the alteration in the speed of the blower means; and adjusting the speed of the blower means in following relation to the static pressure variation in response to the sensing step to effect a variation in the flow rate in following relation with the static pressure variation and establishing thereby the preselected flow rate of the conditioned air through the at least part of the system at the varied static pressure.

8. The method as set forth in claim 7 wherein the system further includes a variable speed dynamoelectric machine energized to rotatably drive the blower means and wherein the altering step includes effecting the speed alteration of the blower means independently of the rotatable drive thereof by the dynamoelectric machine.

9. The method as set forth in claim 7 wherein the system further includes a variable speed dynamoelectric machine energized to rotatably drive the blower means and wherein the setting step includes supplying current at least generally at a preselected value to the dynamoelectric machine to effect its energization to rotatably drive the blower means at the set speed thereof.

10. The method as set forth in claim 9 wherein the adjusting and establishing step includes varying the supplied current from the preselected value thereof in following relation with the sensed alteration in the speed of the blower means and altering thereby, the energization of the dynamoelectric machine to rotatably drive the blower means at its adjusted speed.

11. A system for conditioning air and for maintaining a preselected flow rate of the conditioned air through at least a part of the system regardless of the static pressure therein, the system comprising:
squirrel cage blower means rotatably operable at different speeds against the static pressure in the at least part of the system for effecting the flow therethrough of the conditioned air;
an electronically commutated motor including a stationary assembly having a multi-stage winding arrangement with a plurality of winding stages adapted to be electronically commutated in at least one preselected sequence, and permanent magnet rotor means rotatably associated with said stationary assembly and in selective magnetic coupling relation with at least some of said winding stages upon the electronic commutation thereof in the at least one preselected sequence for conjointly rotating said squirrel cage blower means against the static pressure at a speed to establish the preselected flow rate of the conditioned air through the at least part of the system;
control means operable generally for regulating current supplied to said electronically commutated motor;
means associated with said control means for effecting the supply of current at least generally at a preselected value to said at least some winding stages upon the electronic commutation thereof in the at least one preselected sequence to effect the conjoint rotation of said permanent magnet rotor means and said squirrel cage blower means at the speed establishing the preselected flow rate of the conditioned air;
means for varying the static pressure in the at least part of the system, said squirrel cage blower means reacting in response to only the varied static pressure to alter its speed and that of the permanent magnet rotor means in following relation with the static pressure variation; and
means associated with said control means and operable generally for sensing the speed alteration of said permanent magnet rotor means, said control means being responsive to the sensed speed alteration of said permanent magnet rotor means to adjust the current supplied to said at least some winding stages upon the electronic commutation thereof in the at least one preselected sequence thereby to effect the conjoint rotation of said permanent magnet rotor means and said squirrel cage blower means at an adjusted speed against the varied static pressure acting on said squirrel cage blower means and to reestablish the preselected flow rate of the conditioned air through the at least part of one system at the varied static pressure.

12. A system for conditioning air and for maintaining a preselected flow rate of the conditioned air through a contained space with respect to static pressure therein, the system comprising:
blower means rotatably operable against the static pressure in the contained space for effecting the flow therethrough of the conditioned air;
an electronically commutated motor energized in response to current supplied thereto at least generally at a preselected value to rotatably drive said blower means;
control means operable generally for regulating current supplied to said electronically commutated motor to effect its energization;
means associated with said control means for effecting the supply of current to said electronically commutated motor to rotatably drive said blower means at a speed establishing the preselected flow rate of the conditioned air through the contained space at an existing static pressure therein;
means operable generally for varying the static pressure in the contained space, said blower means reacting against the varied static pressure to alter the speed of said electronically commutated motor in following relation with the static pressure variation; and
means associated with said control means and operable generally for sensing alterations in the speed of the electronically commutated motor, said control means being responsive to the sensed speed alterations of the electronically commutated motor to adjust the current supplied to said electronically commutated motor in following relation with the sensed speed alteration thereby to energize said electronically commutated motor at an adjusted speed and effect its rotatable drive of said blower means against the varied static pressure to reestablish the preselected flow rate of the conditioned air through the contained space at the varied static pressure.

13. The system as set forth in claim 12 wherein said blower means comprises a squirrel cage blower.

14. The system as set forth in claim 12 wherein said varying means comprises at least one vent means adjustably operable for effecting one of an increase and a decrease in the static pressure in the contained space.

15. The system as set forth in claim 12 wherein said sensing means comprises a tachometer.

16. The system as set forth in claim 12 further comprising means for defining a maximum limit and a minimum limit of the current supplied to said electronically commutated motor.

17. A system for conditioning air and for maintaining a preselected flow rate of the conditioned air through a contained space with respect to a static pressure therein, the system comprising:
blower means rotatable at a speed against an existing static pressure in the contained space for establishing the preselected flow rate therethrough of the conditioned air;

means for varying the static pressure in the contained space, said blower means being responsive only to the static pressure variation to effect an alteration in the speed of said blower means in following relation with the static pressure variation;

a variable speed dynamoelectric machine energized to rotatably drive said blower means;

means for sensing the speed alteration of said blower means; and control means operable generally for regulating the energization of said dynamoelectric machine, said control means being responsive to said sensing means to adjust the energization of said dynamoelectric machine in following relation with the sensed speed alteration of said blower means thereby to vary the flow rate of the conditioned air through the contained space and reestablish the preselected flow rate of the conditioned air in the contained space at the varied static pressure acting on said blower means.

18. The system as set forth in claim 17 further comprising means associated with said control means and operable generally for setting the energization of said dynamoelectric machine to effect its rotatable drive of said blower means at the first named speed thereof against the existing static pressure.

19. The system as set forth in claim 17 further comprising means associated with said control means for effecting a supply of current therethrough at least generally at a preselected value to regulate the energization of the dynamoelectric machine and effect its rotatable drive of said blower means at the first named speed thereof against the existing static pressure.

20. The system as set forth in claim 19 wherein said sensing means comprises means associated with said control means for effecting an adjustment in the supply of current to said dynamoelectric machine in the following relation with the sensed speed alteration of said blower means so as to adjust the energization of the dynamoelectric machine and effect its rotatable drive of said blower means against the varied static pressure.

21. A circuit for controlling a dynamoelectric machine associated in driving relation with a blower in an air handling system, the circuit providing control of blower speed over a range of static pressure variations to maintain relatively constant air flow in the system, the circuit comprising:

a power switching circuit operable generally to supply power to the dynamoelectric machine to effect the drive of the blower, the power supplied to the dynamoelectric machine being proportional to an operating speed thereof;

regulator means responsive to a signal representative of a preselected operating speed of the dynamoelectric machine and a signal representative of power supplied to the dynamoelectric machine for controlling the operation of said power switching circuit;

tachometer means operable generally for sensing the operating speed of the dynamoelectric machine and for providing a signal representative thereof to said regulator means; and means associated with said regulator means for summing the tachometer means signal with the preselected operating speed signal to vary the operating speed of the dynamoelectric machine in following relation with the static pressure variations in the system so as to maintain the relatively constant air flow therein.

* * * * *